United States Patent [19]

Uilkema

[11] 3,712,652
[45] Jan. 23, 1973

[54] ADJUSTABLE SKI POLE

[75] Inventor: John K. Uilkema, Moraga, Calif.

[73] Assignee: Telepole, Inc., San Francisco, Calif.

[22] Filed: April 10, 1970

[21] Appl. No.: 27,215

[52] U.S. Cl. ............................287/58 CT, 248/188.5
[51] Int. Cl. .................................................F16b 7/10
[58] Field of Search .287/58 CT, 58; 248/188.5, 423, 248/408, 407

[56] References Cited

UNITED STATES PATENTS

| | | | |
|---|---|---|---|
| 1,756,210 | 4/1930 | Racz | 248/408 |
| 1,787,108 | 12/1930 | Harter | 248/423 |
| 2,594,605 | 4/1952 | Zoppelt | 287/58 CT UX |
| 2,818,290 | 12/1957 | Harocopo | 287/58 CT |
| 3,164,351 | 1/1965 | Rembowski | 248/188.5 |

Primary Examiner—Andrew V. Kundrat
Attorney—Naylor & Neal

[57] ABSTRACT

An improved locking mechanism for selectively securing telescoping inner and outer tubular members of an adjustable ski pole at different composite lengths. The inner tubular member has formed therein an aperture extending along or portion of the length thereof and comprising a plurality of enlarged throughbores interconnected by slots. A spring-biased detent pin projects outwardly through said aperture and into a single hole formed in the outer tubular member. The detent pin includes an enlarged base portion having a necked-down portion extending outwardly therefrom. The associated spring, which is disposed within the inner tubular member, normally urges the detent pin outwardly with respect to the tubular members so that the enlarged base portion thereof is disposed within one of said inner tubular member enlarged throughbores to prevent the pin from moving in said aperture axially along said inner tubular member. Upon depression of the detent pin the necked-down portion thereof is placed in alignment with the inner tubular member wall defining the aperture so that the detent pin may slide within said slots and said outer tubular member may be adjusted with respect to said inner tubular member.

4 Claims, 8 Drawing Figures

PATENTED JAN 23 1973 3,712,652
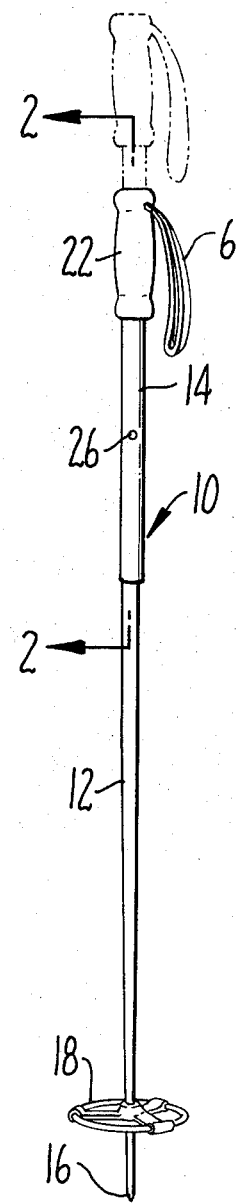
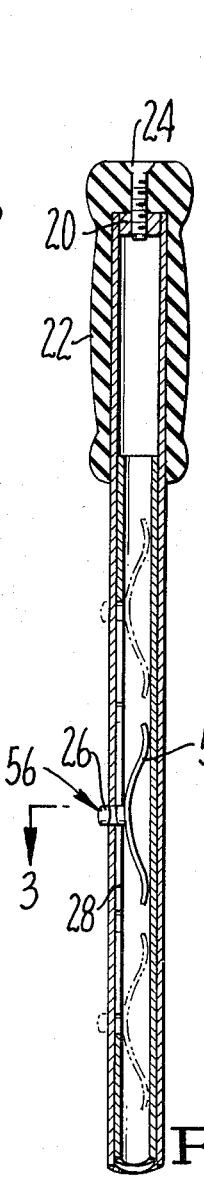
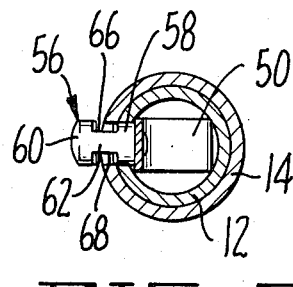
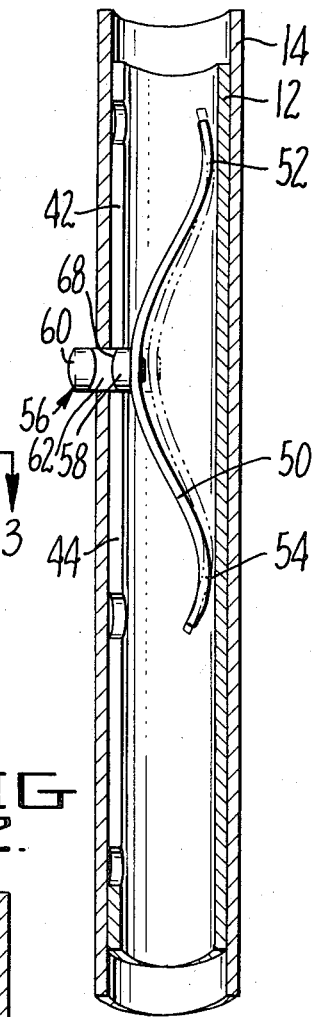
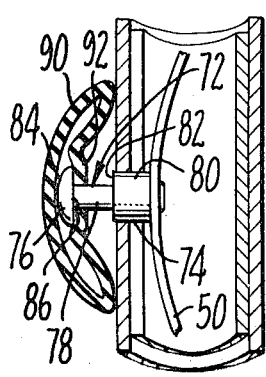
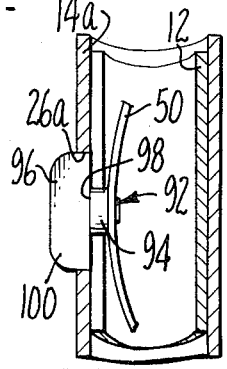
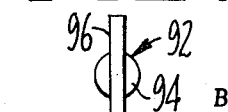
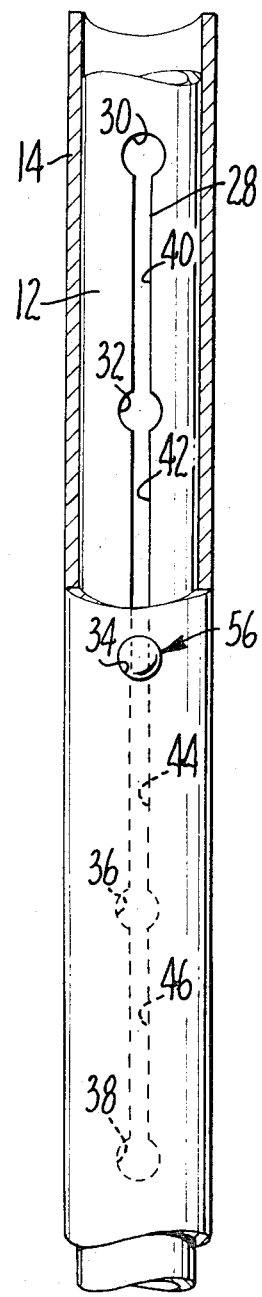
INVENTOR.
JOHN K. UILKEMA
BY Naylor & Neal
ATTORNEYS

ADJUSTABLE SKI POLE

BACKGROUND OF THE INVENTION

The present invention relates to adjustable length ski poles and, more particularly, to an improved mechanism for selectively locking said poles at different composite lengths.

In the prior art various types of adjustable length ski poles have been provided. Quite often, such prior art adjustable ski poles incorporate telescoping sections interrelated for relative movement with respect to one another to vary their composite lengths. A number of locking mechanisms have been devised in the past to selectively lock adjustable ski pole sections against movement relative to each other. Many of these locking mechanisms, however, have been of relatively complicated construction and, at least somewhat, not positive in their operation. The most typical of these employs a wedging lock secured to the inner of the telescoping sections for expansion into frictional engagement with the outer of the sections. A mechanism of this type is shown in U.S. Pat. No. 2,456,205. Others employ wedging lock connections wherein the wedging mechanism is carried on the outer of the sections for compressing into frictional engagement with the inner of the sections. Others employ cam operated detents carried by one of the sections for selective compression into engagement with the other of the sections. A device of the type is shown in U.S. Pat. No. 2,289,818. Yet others employ inwardly biased pin detents, as disclosed in U.S. Pat. No. 2,818,290. These require a relatively large knob to facilitate withdrawal of the pin.

Still other adjustable ski pole designs incorporate a locking mechanism wherein an outwardly biased detent pin projects through an aperture formed in the inner member and is selectively adapted to enter into a plurality of apertures formed in the outer member for providing adjustment between the two members. Arrangements of this type are exemplified by the device shown in U.S. Pat. No. 3,347,575. The plurality of apertures in the outer section provide an unesthetic appearance and, in addition, in the absence of any guide against relative rotation between the members, the detent pin may be "lost" when the pin is moved from one aperture to another. In the event such a guide against rotational movement is provided on the members to prevent misalignment between the detent pin and the apertures as it is being moved therebetween, undesirable pole instability or weakness may result.

SUMMARY OF THE INVENTION

It is therefore an object of the present invention to provide an improved mechanism for preventing relative movement between telescoping segments of an adjustable ski pole.

Another object of the invention is to provide such a mechanism employing a depressible detent pin so disposed as to maintain the telescoping segments in alignment and against separation during adjustment. With respect to this object it is another and related object to provide such a mechanism wherein the pin need not be depressed completely through one of the tubes to facilitate adjustment and wherein the head of the pin is of a relatively minimal area.

It is a further object of the present invention to provide a locking arrangement for positively preventing relative movement between two members of a telescoping ski pole which is relatively simple in construction and incorporates a locking detent pin which is under the control of the ski pole operator at all times when relative adjustment is desired between the telescoping members thereof.

The above-noted and other objects have been attained in accordance with the teachings of the prevent invention by providing an improved locking mechanism for an adjustable ski pole comprising an inner tubular member and an outer tubular member telescopically movable with respect to one another to selectively vary their composite lengths. The mechanism comprises an aperture formed in said inner tubular member and extending along a portion of the length thereof. The aperture includes a plurality of enlarged throughbores interconnected by slots. Disposed within the inner tubular member is a spring. A detent pin is affixed to the spring and is urged outwardly through said aperture. The outer tubular member has formed therein a single hole into which the detent pin extends. The detent pin includes an enlarged base portion, a necked-down portion and a crown portion. In the normal locking position assumed thereby under the urging of the spring the detent pin is positioned with the enlarged base portion thereof extending through one of said enlarged throughbores so that the pin is prevented from moving in said slots. Upon manual depression of the detent pin crown portion the pin will move inwardly against the urging of the spring and the necked-down portion thereof will be disposed in alignment with the inner tubular member wall which defines the aperture. By maintaining pressure on the detent pin to keep it in this latter position the pin may move within the slots and the inner and outer tubular members may be moved with respect to one another. When the desired composite length is reached, the detent pin is again allowed to move outwardly under the influence of the spring to allow the enlarged base portion thereof to pass through a newly selected enlarged throughbore formed in said inner tubular member.

DESCRIPTION OF THE DRAWINGS

The above-noted and other objects of this invention will be understood from the following description taken with reference to the drawings wherein:

FIG. 1 is an elevational view of an adjustable ski pole incorporating a locking mechanism constructed in accordance with the teachings of the present invention, with solid and phantom line representations showing the pole in retracted and extended positions respectively.

FIG. 2 is a sectional view taken on the plane designated by line 2—2 in FIG. 1, with solid line representations showing the telescoping tubular members of the pole locked in a median position, and phantom line representations showing the telescoping tubular members locked, respectively, in their shortest composite length and longest composite length positions.

FIG. 3 is a sectional view taken on the plane designated by the 3—3 in FIG. 2.

FIG. 4 is an enlarged sectional view similar to FIG. 2, with parts thereof broken away, showing the detent pin and spring in extended and depressed positions by solid and phantom line representations, respectively.

FIG. 5 is an enlarged fragmentary view illustrating details of the inner tubular member aperture.

FIG. 6 is a partial sectional enlarged view illustrating details of a first alternative form of detent pin.

FIG. 7 is a partial sectional view illustrating details of a second alternative form of detent pin and the modified outer tube employed therewith.

FIG. 8 is a plan view of the second alternative form of pin from FIG. 7.

DESCRIPTION OF THE ILLUSTRATED EMBODIMENTS

In the drawings, the ski pole embodying the invention is designated in its entirety by the numeral 10. As its basic elements, the ski pole comprises a lower tubular member 12 and an upper tubular member 14 telescopically engaged therewith. The lower tubular member terminates in a closed point 16 and has a snow ring 18 secured thereto in spaced relationship to the point. The upper tubular member 14 has a threaded plug 20 in the terminal end thereof, to which a molded grip 22 is attached by a screw 24. The grip carries a wrist ring 6 of conventional character.

The lower tubular member 12 is telescopically received within the upper tubular member 14 for telescopic movement relative thereto to selectively vary the composite length of the pole. Because of their interrelationship relative to each other, the tubular members 12 and 14 may be referred to as "inner" and "outer", respectively. Formed in upper tubular member 14 is a hole 26 which is positioned in spaced relationship to the open lower end of said tubular member.

As may most readily be seen with reference to FIGS. 2, 3, 4 and 5, inner tubular member 12 has formed in the side wall thereof an aperture 28. Aperture 28 comprises a plurality of enlarged throughbores 30, 32, 34, 36 and 38 which are interconnected by means of a series of relatively narrow slots 40, 42, 44 and 46 in the manner most readily seen with reference to FIG. 5. The enlarged throughbores are positioned for individual alignment with the hole 26 upon selective telescoping of tubular members 12 and 14 to different composite lengths. Preferably, the diameters of the enlarged throughbores correspond to that of the hole 26.

Positioned within inner tubular member 12 is a leaf spring 50 which is of elongated bow-shaped configuration and provided with upwardly bent, rounded ends 52 and 54. Secured to the central portion of leaf spring 50 by any desired expedient such as by being riveted thereto is a detent pin 56. Leaf spring 50 continuously urges detent pin 56 in an outwardly direction so that when the ski pole is in the illustrated assembled condition the detent pin extends outwardly through aperture 28.

Detent pin 56 comprises an enlarged base portion 58, a crown portion 60 and a necked-down or channel portion 62 interconnecting said enlarged base portion and said crown portion. As may most readily be seen with reference to FIGS. 3 and 4, channel portion 62 in the direction corresponding to the longitudinal axis of aperture 28 corresponds to the cross-sectional dimensions of portions 58 and 60. In a direction perpendicular to the longitudinal axis of aperture 28, however, the channel portion 62 has a cross-sectional dimension substantially less than that of base portion 58 and crown portion 60. This latter dimension generally corresponds to the width of the slots which partially comprise aperture 28.

Enlarged base portion 58 and crown portion 60 each have a generally circular cross-sectional diameter slightly smaller than the diameters of the inner tubular member enlarged throughbores and the outer tubular member hole. In addition, along a plane corresponding to the longitudinal axis of aperture 28, enlarged base portion 58 and crown portion 60 have generally convex surfaces lying on both sides of channel portion 62 and with said channel portion define grooves 66 and 68 which diverge outwardly at both the tops and bottoms thereof. The minimum width of the grooves 66 and 68, i.e. the minimum distance between enlarged base portion 58 and crown portion 60, is somewhat greater than the thickness of the side wall of inner tubular member 12.

Due to the action of leaf spring 50 the detent pin 56 when serving to maintain tubular members 12 and 14 in locked relationship extends through one of the inner tubular member enlarged throughbores and outwardly through hole 26 formed in the outer tubular member. In this position, enlarged base portion 58 of the detent pin is disposed within a pre-selected enlarged throughbore. In FIG. 4 the pre-selected enlarged throughbore is that which is designated by means of reference numeral 34. The fact that base portion 58 has a greater thickness than do slots 42 and 44 which communicate with enlarged throughbore 34 means that inner tubular member 12 cannot move with respect to the detent pin. By the same token, outer tubular member 14 is prevented from moving with respect to the detent pin due to the engagement of the side wall thereof with detent pin channel portion 62. In this manner, inner tubular member 12 and outer tubular member 14 are prevented from moving longitudinally with respect to one another and are locked in a pre-selected composite length. The tubular members are preferably dimensioned so as to have a close sliding fit therebetween. Thus, upon locking of the tubular members against relative longitudinal motion the ski pole 10 constitutes a very stable structure adapted to take hard skiing. This close fit also has the advantage that the outer member 14 functions to reinforce the inner member 12 and prevent spreading of the elongated aperture 28. In the preferred embodiment the member 14 is of such a length relative to the aperture 28 and the aperture 26 is so positioned that elongated aperture 28 is fully confined within the outer member 14 during all conditions of adjustment.

When it is desired to either lengthen or shorten the ski for some reason, such as to accommodate different snow conditions, the detent pint 56 is manually depressed against the force imparted by leaf spring 50. As may be seen most readily with reference to FIG. 4, the rounded-ends 52 and 54 of the leaf spring slide away from one another along the inner surface of the inner tubular member side wall so as to accommodate for the depression of the detent pin. Depression of the detent pin continues until grooves 66 and 68 thereof are in registry with slots 42 and 44. The detent pin is kept depressed and tubular members 12 and 14 are moved longitudinally with respect to one another to provide either a shorter or longer composite length.

Due to the convex surfaces of enlarged base portion 58 and crown portion 60 movement through the slots by the detent pin is facilitated. The doubly diverging configuration of the grooves also provides the operator with some latitude as to how far the detent pin need be depressed before relative movement between the tubular members is permitted. It will be readily understood that as soon as the desired pre-selected composite length is reached, the operator will release pressure from the detent pin and the pin will be urged outwardly by leaf spring 50 so that the enlarged base portion thereof enters into an enlarged throughbore corresponding to the new pre-selected composite length. It will also be understood that a portion of the pin remains in both the aperture 26 and the aperture 28 during all conditions of adjustment and, thus, the apertures are maintained in alignment and the tubular member 12 and 14 are prevented from completely separating.

Referring now to FIG. 6, another (first alternative) form of detent pin suitable for use in accordance with the teachings of the present invention is illustrated. The pin, generally designated by means of reference numeral 72, comprises an enlarged base portion 74, a crown portion 76, and a necked-down or channel portion 78 extending between said base portion and said crown portion. In this alternative embodiment the base portion, which is secured to the associated leaf spring 50 by means of riveting or the like, has a generally cylindrical side wall 80 and an outwardly extending flat surface 82. Crown portion 76 defines a curved outer wall 84 and an inwardly extending flat surface 86 which is disposed adjacent to but in spaced relationship with flat surface 82. Necked-down or channel portion 78 comprises an elongated member extending between the base portion and the crown portion and having a generally circular cross section. The diameter of channel member 78 is slightly less than the width of the associated inner tubular member slots. Extending about crown portion 76 is a hollow member 90 which is constructed of rubber or other suitably resilient material. In the inwardly extending wall 92 of the hollow member an aperture is formed through which channel portion 78 projects. If desired, wall 92 of the hollow member may be additionally secured to the detent pin as by being secured to inwardly extending flat surface 86 of crown portion 76 by adhesive or the like. The distance between wall 92 of hollow member 90 and flat surface 82 of base portion 74 is somewhat greater than the combined thickness of the side walls of the inner and outer tubular members.

The operation of the detent pin 72 is substantially the same as the pin 56 shown in FIGS. 2 – 5. When the operator desires a different composite ski pole length, he presses down upon hollow member 90 which deforms and comes in contact with crown portion 76. Under continued pressure detent pin 72 moves inwardly to force enlarged base portion 74 out of one of the ski pole inner tubular member enlarged throughbores and place channel portion 78 in registry with the slots adjoining that enlarged throughbore. By maintaining pressure on the hollow member 90 and moving outer tubular member 14 either upwardly or downwardly with respect to inner tubular member 12 the desired new composite length is attained. The operator then releases pressure upon hollow member 90 and the detent pin 72 under the influence of its associated leaf spring moves outwardly into a new enlarged throughbore corresponding to the new composite length. The hollow member 90 provides some degree of protection for detent pin 72 and its associated structure. In addition, such hollow member may be utilized to assist in providing an overall esthetically pleasing appearance to the ski pole.

Referring now to FIGS. 7 and 8, another (second alternative) form of detent pin suitable for use in accordance with the teachings of the present invention is illustrated. The pin is designated in its entirety by the numeral 92 and comprises an enlarged base portion 94 of generally circular cross section and a thin distal section 96 fixed to and extending outwardly from the base portion. The base portion 94 is secured to the associated leaf spring 50 by riveting or the like and has a generally flat outwardly disposed surface 98. The distal section 96 extends outwardly from the surface 98 and defines a blade of generally uniform cross section having rounded edges 100. The distal section 96 is of such a width that it may be depressed into the slots interconnecting the throughbores of the inner tubular member 12. The depth of the section 96 is sufficient to permit the section to be manually depressed by finger pressure to an extent wherein the enlarged base portion 94 is completely displaced from the throughbores in the inner member 12.

The outer tubular member of the FIGS. 7 and 8 embodiment is designated by the numeral 14a and differs from the member 14 only in that the hole therein, designated 26a is of slot-shaped configuration, rather than round. The hole 26a is proportioned for slidable, but snug receipt of the distal section 96. The base portion 94 of the pin 92 is proportioned similarly to the base portion 58 for snug, but slidable, receipt in the throughbores of the inner tubular member 12.

In operation, the spring 50 functions to normally urge the pin 92 to the position illustrated in FIG. 7. As thus positioned, the base portion 94 is in abutting received condition with one of the throughbores in the inner tube 12 and the distal section 96 is in abutting received condition with the slot 26a. Thus, the inner and outer tubular members are locked against telescopic movement relative to each other.

The operation of the detent pin 92 is similar to that of the pins 56 and 72. When the operator desires a different composite ski pole length, he presses down on the distal section 96 to move the base portion 94 out of engagement with the throughbore in which it is received and to force the distal section into the throughbore and the slots to either side thereof. In this condition, the distal section is slidably received within the interconnecting slots and throughbores of the inner tubular member 12 and, thus, the inner and outer members may be telescoped relative to one another. By maintaining the distal section 96 in the depressed condition and moving the outer tubular member either upwardly or downwardly with respect to the inner tubular member, the desired new composite length may be attained. The operator then releases the pressure and the detent pin 92, under the influence of the spring 50, moves outwardly into a new enlarged throughbore corresponding to the new composite length. During the entire operation, a portion of the distal section 96 always remains in the slot-shaped hole 26a and, thus, the section is always maintained in alignment with the hole and functions to maintain the inner and outer tubes in alignment.

While not illustrated, it should be understood that slots in the inner tube 12 of the FIG. 7 and 8 embodiment extend slightly beyond the outermost throughbores 30 and 38 to accommodate movement of the distal section 96 to positions wherein the base portion 94 aligns with these throughbores.

It is herein noted that in all embodiments of the invention the spring 50 functions to limit the outward extension of the pin associated therewith. This results from abutment of the bowed central portion of the spring with the inner surface of the tube. This limiting function results in maintenance of the pin in a predetermined locking position when the pin is permitted to fully extend under the influence of the spring.

From the foregoing description it will be readily apparent to those skilled in the art that various changes and modifications may be made in the illustrated embodiments without departing from the spirit of the invention or from the scope of the subjoined claims. For example, when desired the outward movement of the pin in the FIG. 7 and 8 embodiment may be limited by abutment of the base portion 94 with the inner surface of the outer tubular member 14a, rather than by abutment of the spring 50 with the inner tube 12.

I claim as my invention:

1. In an adjustable length pole comprising a pair of telescoping tubular members movable relative to each other to selectively vary the composite length thereof, an improved mechanism for selectively locking the tubular members against movement relative to each other at different composite lengths, said mechanism comprising:

an aperture defined by a side wall of said inner tubular member comprising a plurality of spaced throughbores disposed partially along the length of said inner tubular member and a series of slots defined by said inner tubular member side wall with one of said slots extending between each adjacent pair of throughbores;

a hole formed in a side wall of the outer tubular member, said hole being adapted for selective alignment with each of said throughbores upon relative axial movement between said tubular members to form different composite lengths, a detent pin slidably received in said inner tubular member aperture and said outer tubular member hole, said pin being axially movable between a first position wherein it assumes locking engagement with the hole and a throughbore aligned therewith and a second position wherein it is slidable within the slots to permit the composite length of the pole to be adjusted and said pin being proportioned so that when in the second position it is slidably engaged within the hole and aperture to maintain the alignment thereof; and, a spring disposed in said inner tubular member, and connected to the pin to normally bias the pin to the first position, said spring being deflectable to permit the pin to be manually moved to the second position.

2. In an adjustable length pole comprising a pair of telescoping tubular members movable relative to each other to selectively vary the composite length thereof, an improved mechanism for selectively locking the tubular members against movement relative to each other at different composite lengths, said mechanism comprising:

an aperture defined by a side wall of said inner tubular member, said aperture comprising a plurality of spaced throughbores disposed partially along the length of said inner tubular member and slots of a width less than the throughbores interconnecting adjacent throughbores;

a hole formed in a side wall of the outer tubular member, said hole being adapted for selective alignment with each of said throughbores upon relative axial movement between said tubular members to form different composite lengths; and a detent pin slidably received in said inner tubular member aperture and said outer tubular member hole, said detent pin being selectively receivable within each of said throughbores in accordance with the composite length assumed by said tubular members;

a spring disposed in said inner tubular member, said detent pin being connected to said spring and continuously urged by said spring outwardly through said aperture and said hole, said pin being selectively slidable within both said hole and said aperture between an adjustment position and a locking position;

limit means to limit the extent to which said pin is urged outwardly relative to the hole and a throughbore aligned therewith, said spring and limit means functioning to dispose said pin in a predetermined locking position when said pin is permitted to extend through said hole and a throughbore aligned therewith under the influence of said spring and wherein:

a. said detent pin comprises an enlarged base portion having a thin section extending outwardly therefrom;

b. said thin section and base portion being disposed, respectively, for abutting engagement with the hole and a throughbore aligned therewith when said pin is in the locking position to prevent relative movement between said tubular members;

c. said thin section and base portion are proportioned so that upon depression of said pin out of the locking position the base portion is moved out of a condition disposed for abutting engagement with the throughbore and the thin section is disposed for slidable receipt in the slots connecting adjacent throughbores whereby said tubular members may be telescopically moved relative to one another; and, d. said thin section is proportioned to be slidably engaged within the hole and aperture when depressed out of the locking position to maintain the alignment thereof.

3. In an adjustable length pole comprising a pair of telescoping tubular members movable relative to each other to selectively vary the composite length thereof, an improved mechanism for selectively locking the tubular members against movement relative to each other at different composite lengths, said mechanism comprising:
- an aperture defined by a side wall of said inner tubular member comprising a plurality of spaced throughbores disposed partially along the length of said inner tubular member and a series of slots defined by said inner tubular member side wall with one of said slots extending between each adjacent pair of throughbores;
- a hole formed in a side wall of the outer tubular member, said hole being adapted for selective alignment with each of said throughbores upon relative axial movement between said tubular members to form different composite lengths;
- a detent pin slidably received in said inner tubular member aperture and said outer tubular member hole, said detent pin being selectively receivable within each of said throughbores in accordance with the composite length assumed by said tubular members and comprising a crown portion, and an enlarged base portion, said crown portion and enlarged base portion being interconnected by a relatively narrow channel portion and said crown portion and enlarged base portion cooperating to form divergent grooves on the sides of said channel portion to facilitate movement of said detent pin within said slots; and
- a spring disposed in said inner tubular member, said detent pin being connected to said spring and continuously urged by said spring outwardly through said aperture and said hole, said pin being selectively slidable within both said hole and said aperture between an adjustment position and a locking position, said detent pin when in said locking position having the enlarged base portion thereof extending through one of said throughbores and when in said adjustment position having said channel portion in alignment with said inner tubular member wall whereby said detent pin may be moved axially with respect to said inner tubular member and within said slots.

4. In an adjustable length pole comprising a pair of telescoping tubular members movable relative to each other to selectively vary the composite length thereof, an improved mechanism for selectively locking the tubular members against movement relative to each other at different composite lengths, said mechanism comprising:
- an aperture defined by a side wall of said inner tubular member comprising a plurality of spaced throughbores disposed partially along the length of said inner tubular member and a series of slots defined by said inner tubular member side wall with one of said slots extending between each adjacent pair of throughbores;
- a hole formed in a side wall of the outer tubular member, said hole being adapted for selective alignment with each of said throughbores upon relative axial movement between said tubular members to form different composite lengths;
- a detent pin slidably received in said inner tubular member aperture and said outer tubular member hole, said detent pin being selectively receivable within each of said throughbores in accordance with the composite length assumed by said tubular members and comprising a crown portion, and an enlarged base portion, said crown portion and enlarged base portion being interconnected by a relatively narrow channel portion;
- a spring disposed in said inner tubular member, said detent pin being connected to said spring and continuously urged by said spring outwardly through said aperture and said hole, said pin being selectively slidable within both said hole and said aperture between an adjustment position and a locking position, said crown portion being disposed within a protective resilient member adapted to be manually engaged to move said detent pin between said adjustment position and said locking position, said detent pin when in said locking position having the enlarged base portion thereof extending through one of said throughbores and when in said adjustment position having said channel portion in alignment with said inner tubular member wall whereby said detent pin may be moved axially with respect to said inner tubular member and within said slots.

* * * * *